United States Patent
Pallemulle et al.

(10) Patent No.: US 10,726,095 B1
(45) Date of Patent: Jul. 28, 2020

(54) NETWORK CONTENT LAYOUT USING AN INTERMEDIARY SYSTEM

(71) Applicant: Amazon Technologies, Inc., Seattle, WA (US)

(72) Inventors: Sajeeva Lakmal Bandara Pallemulle, Woodinville, WA (US); Muneer Mirza, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/715,673

(22) Filed: Sep. 26, 2017

(51) Int. Cl.
*G06F 16/957* (2019.01)
*G06F 3/048* (2013.01)
*G06F 16/9535* (2019.01)
*G06F 16/958* (2019.01)
*G06F 17/00* (2019.01)

(52) U.S. Cl.
CPC .......... *G06F 16/9577* (2019.01); *G06F 3/048* (2013.01); *G06F 16/9535* (2019.01); *G06F 16/958* (2019.01)

(58) Field of Classification Search
CPC ......... G06F 17/30905; G06F 17/30867; G06F 16/9577; G06F 16/9535; G06F 3/048; G06F 16/958
See application file for complete search history.

(56) References Cited

U.S. PATENT DOCUMENTS

| | | | |
|---|---|---|---|
| 5,634,064 A | 5/1997 | Warnock et al. | |
| 5,872,850 A | 2/1999 | Klein et al. | |
| 5,961,593 A | 10/1999 | Gabber et al. | |
| 6,049,812 A | 4/2000 | Bertram et al. | |
| 6,108,637 A | 8/2000 | Blumenau | |
| 6,138,156 A | 10/2000 | Fletcher et al. | |
| 6,195,679 B1 | 2/2001 | Bauersfeld et al. | |
| 6,430,624 B1 | 8/2002 | Jamtgaard et al. | |
| 6,549,941 B1 | 4/2003 | Jaquith et al. | |
| 6,560,620 B1 | 5/2003 | Ching | |

(Continued)

FOREIGN PATENT DOCUMENTS

WO  WO 2013/003631 A2  1/2013

OTHER PUBLICATIONS

Bango, Rey "How JS & Ajax work in Opera Mini 4", Nov. 2, 2007, XP055050107, Retrieved from the Internet.

(Continued)

*Primary Examiner* — Quoc A Tran
(74) *Attorney, Agent, or Firm* — Knobbe, Martens, Olson & Bear, LLP (57) ABSTRACT

Systems, methods, and computer-readable media are described for automated optimization of one or more pages for display by a mobile computing device. Based on an analysis of the series of actions taken by a number of different users when interacting with one or more pages, a system may group the users into two or more groups based on similarities in the users' action paths. The system may then generate an optimized page template for the group that includes identifiers of the portions of at least one page determined to be frequently accessed or otherwise of interest to the users in the group, and that excludes at least some other portions of the at least one page. This template may be subsequently used to generate a modified version of a page for display on a mobile computing device operated by a member of the group.

19 Claims, 5 Drawing Sheets

(56) References Cited

U.S. PATENT DOCUMENTS

| | | |
|---|---|---|
| 6,625,624 B1 | 9/2003 | Chen et al. |
| 6,704,024 B2 | 3/2004 | Robotham et al. |
| 6,785,864 B1 | 8/2004 | Te et al. |
| 6,871,236 B2 | 3/2005 | Fishman et al. |
| 6,944,665 B2 | 9/2005 | Brown et al. |
| 6,963,850 B1* | 11/2005 | Bezos ............... G06F 17/30867 705/26.41 |
| 7,003,442 B1 | 2/2006 | Tsuda |
| 7,051,084 B1 | 5/2006 | Hayton et al. |
| 7,054,952 B1 | 5/2006 | Schwerdtfeger et al. |
| 7,085,736 B2 | 8/2006 | Keezer et al. |
| 7,159,023 B2 | 1/2007 | Tufts |
| 7,171,478 B2 | 1/2007 | Lueckhoff et al. |
| 7,191,211 B2 | 3/2007 | Tuli |
| 7,353,252 B1 | 4/2008 | Yang et al. |
| 7,373,313 B1 | 5/2008 | Kahle et al. |
| 7,543,059 B2 | 6/2009 | Johnson et al. |
| 7,792,944 B2 | 9/2010 | DeSantis et al. |
| 7,831,582 B1 | 11/2010 | Scofield et al. |
| 7,975,000 B2 | 7/2011 | Dixon et al. |
| 7,996,912 B2 | 8/2011 | Spalink et al. |
| 8,010,545 B2 | 8/2011 | Stefik et al. |
| 8,015,496 B1 | 9/2011 | Rogers |
| 8,060,463 B1 | 11/2011 | Spiegel |
| 8,073,850 B1 | 12/2011 | Hubbard et al. |
| 8,103,742 B1 | 1/2012 | Green |
| 8,185,621 B2 | 5/2012 | Kasha |
| 8,249,904 B1 | 8/2012 | DeSantis et al. |
| 8,271,887 B2 | 9/2012 | Offer et al. |
| 8,316,124 B1 | 11/2012 | Baumback et al. |
| 8,336,049 B2 | 12/2012 | Medovich |
| 8,989,718 B2 | 3/2015 | Ramer |
| 9,037,975 B1 | 5/2015 | Taylor et al. |
| 9,137,210 B1 | 9/2015 | Joglekar et al. |
| 9,183,258 B1* | 11/2015 | Taylor ............... G06F 17/30867 |
| 9,563,928 B1 | 2/2017 | Sokolowski et al. |
| 9,563,929 B1 | 2/2017 | Sokolowski et al. |
| 9,720,888 B1 | 8/2017 | Jain et al. |
| 9,723,053 B1 | 8/2017 | Pallemulle et al. |
| 10,142,272 B2* | 11/2018 | Chakra ............... G06F 16/972 |
| 2001/0039490 A1 | 11/2001 | Verbitsky et al. |
| 2002/0030703 A1 | 3/2002 | Robertson et al. |
| 2002/0040395 A1 | 4/2002 | Davis et al. |
| 2002/0099829 A1 | 7/2002 | Richards et al. |
| 2002/0194302 A1 | 12/2002 | Blumberg |
| 2003/0023712 A1 | 1/2003 | Zhao et al. |
| 2003/0041106 A1 | 2/2003 | Tuli |
| 2004/0083294 A1 | 4/2004 | Lewis |
| 2004/0139208 A1 | 7/2004 | Tuli |
| 2004/0181613 A1 | 9/2004 | Hashimoto et al. |
| 2004/0205448 A1 | 10/2004 | Grefenstette et al. |
| 2004/0220905 A1 | 11/2004 | Chen et al. |
| 2004/0243622 A1 | 12/2004 | Morisawa |
| 2004/0267723 A1 | 12/2004 | Bharat |
| 2005/0010863 A1 | 1/2005 | Zernik |
| 2005/0060643 A1 | 3/2005 | Glass et al. |
| 2005/0138382 A1 | 6/2005 | Hougaard et al. |
| 2005/0183039 A1 | 8/2005 | Revis |
| 2005/0246193 A1 | 11/2005 | Roever et al. |
| 2006/0085766 A1 | 4/2006 | Dominowska et al. |
| 2006/0095336 A1 | 5/2006 | Heckerman et al. |
| 2006/0122889 A1 | 6/2006 | Burdick et al. |
| 2006/0168510 A1 | 7/2006 | Bryar et al. |
| 2006/0184421 A1 | 8/2006 | Lipsky et al. |
| 2006/0248442 A1 | 11/2006 | Rosenstein et al. |
| 2006/0277167 A1 | 12/2006 | Gross et al. |
| 2006/0294461 A1 | 12/2006 | Nadamoto et al. |
| 2007/0022072 A1 | 1/2007 | Kao et al. |
| 2007/0027672 A1 | 2/2007 | Decary et al. |
| 2007/0094241 A1 | 4/2007 | Blackwell et al. |
| 2007/0124693 A1 | 5/2007 | Dominowska et al. |
| 2007/0139430 A1 | 6/2007 | Korn et al. |
| 2007/0226044 A1 | 9/2007 | Hanson |
| 2007/0240160 A1 | 10/2007 | Paterson-Jones et al. |
| 2007/0288589 A1 | 12/2007 | Chen et al. |
| 2007/0288855 A1 | 12/2007 | Rohrbaugh et al. |
| 2008/0028334 A1 | 1/2008 | De Mes |
| 2008/0086264 A1 | 4/2008 | Fisher |
| 2008/0104502 A1 | 5/2008 | Olston |
| 2008/0183672 A1 | 7/2008 | Canon et al. |
| 2008/0184128 A1 | 7/2008 | Swenson et al. |
| 2008/0222273 A1* | 9/2008 | Lakshmanan ...... G06F 17/30247 709/219 |
| 2008/0320225 A1 | 12/2008 | Panzer et al. |
| 2009/0012969 A1 | 1/2009 | Rail et al. |
| 2009/0164924 A1 | 6/2009 | Flake et al. |
| 2009/0177538 A1 | 7/2009 | Brewer et al. |
| 2009/0204478 A1 | 8/2009 | Kaib et al. |
| 2009/0217199 A1 | 8/2009 | Hara et al. |
| 2009/0248680 A1 | 10/2009 | Kalavade |
| 2009/0254867 A1 | 10/2009 | Farouki et al. |
| 2009/0282021 A1 | 11/2009 | Bennett |
| 2009/0287698 A1 | 11/2009 | Marmaros et al. |
| 2009/0327914 A1 | 12/2009 | Adar et al. |
| 2010/0036740 A1 | 2/2010 | Barashi |
| 2010/0057639 A1 | 3/2010 | Schwarz et al. |
| 2010/0094878 A1 | 4/2010 | Soroca et al. |
| 2010/0125507 A1 | 5/2010 | Tarantino, III et al. |
| 2010/0131594 A1 | 5/2010 | Kashimoto |
| 2010/0138293 A1 | 6/2010 | Ramer et al. |
| 2010/0218106 A1 | 8/2010 | Chen et al. |
| 2010/0293190 A1 | 11/2010 | Kaiser et al. |
| 2010/0306335 A1 | 12/2010 | Rios et al. |
| 2010/0312788 A1 | 12/2010 | Bailey |
| 2010/0318892 A1 | 12/2010 | Teevan et al. |
| 2010/0332513 A1 | 12/2010 | Azar et al. |
| 2011/0022957 A1 | 1/2011 | Lee |
| 2011/0029854 A1 | 2/2011 | Nashi et al. |
| 2011/0055203 A1 | 3/2011 | Gutt et al. |
| 2011/0078140 A1 | 3/2011 | Dube et al. |
| 2011/0078705 A1 | 3/2011 | Maclinovsky et al. |
| 2011/0119661 A1 | 5/2011 | Agrawal et al. |
| 2011/0161849 A1 | 6/2011 | Stallings et al. |
| 2011/0173177 A1 | 7/2011 | Junqueira et al. |
| 2011/0173637 A1 | 7/2011 | Brandwine et al. |
| 2011/0178868 A1 | 7/2011 | Garg et al. |
| 2011/0185025 A1 | 7/2011 | Cherukuri et al. |
| 2011/0191327 A1 | 8/2011 | Lee |
| 2011/0197121 A1 | 8/2011 | Kletter |
| 2011/0212717 A1 | 9/2011 | Rhoads et al. |
| 2011/0214082 A1 | 9/2011 | Osterhout et al. |
| 2011/0246873 A1 | 10/2011 | Tolle et al. |
| 2011/0289074 A1 | 11/2011 | Leban |
| 2011/0296341 A1 | 12/2011 | Koppert |
| 2011/0302510 A1* | 12/2011 | Harrison .......... G06F 17/30899 715/760 |
| 2012/0072821 A1 | 3/2012 | Bowling |
| 2012/0084644 A1 | 4/2012 | Robert et al. |
| 2012/0096365 A1 | 4/2012 | Wilkinson et al. |
| 2012/0110017 A1 | 5/2012 | Gu et al. |
| 2012/0137201 A1 | 5/2012 | White et al. |
| 2012/0143944 A1 | 6/2012 | Reeves et al. |
| 2012/0150844 A1 | 6/2012 | Lindahl et al. |
| 2012/0166922 A1 | 6/2012 | Rolles |
| 2012/0198516 A1 | 8/2012 | Lim |
| 2012/0210233 A1 | 8/2012 | Davis et al. |
| 2012/0215834 A1 | 8/2012 | Chen et al. |
| 2012/0215919 A1 | 8/2012 | Labat |
| 2012/0284629 A1 | 11/2012 | Peters et al. |
| 2012/0290950 A1 | 11/2012 | Rapaport et al. |
| 2012/0317295 A1 | 12/2012 | Baird et al. |
| 2012/0331406 A1 | 12/2012 | Baird et al. |
| 2013/0007101 A1 | 1/2013 | Trahan et al. |
| 2013/0031459 A1 | 1/2013 | Khorashadi |
| 2013/0031461 A1 | 1/2013 | Hou et al. |
| 2013/0066673 A1 | 3/2013 | Rose |
| 2013/0080611 A1* | 3/2013 | Li ..................... H04N 21/222 709/223 |
| 2013/0103764 A1 | 4/2013 | Verkasalo |
| 2013/0198641 A1 | 8/2013 | Brownlow et al. |
| 2013/0275889 A1 | 10/2013 | O'Brien-Strain |
| 2014/0136942 A1 | 5/2014 | Kumar et al. |

(56) References Cited

U.S. PATENT DOCUMENTS

2014/0136951 A1    5/2014    Kumar et al.
2014/0136971 A1    5/2014    Kumar et al.
2014/0136973 A1    5/2014    Kumar et al.

OTHER PUBLICATIONS

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.
Brinkmann, M, "Record and Share your browser history with Hooeey," ghacks.net, Feb. 26, 2008, 6 pages, printed on Jan. 25, 2013.
Chen, H., et al., "Bringing Order to the Web: Automatically Categorizing Search Results," Proceedings of the SIGCHI Conference on Human Factors in Computing Systems, Apr. 1-6, 2000, pp. 145-152.
Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.
Considine, A, "The Footprints of Web Feet," The New York Times, Mar. 4, 2011, 3 pages, printed on Jan. 25, 2013.
De Carvalho, L.G., et al., Synchronizing Web Browsing Data With Browserver, Proceedings of the IEEE Symposium on Computers and Communications, Jun. 22-25, 2010, Riccione, Italy, pp. 738-743.
EyeBrowse: Record, Visualize and Share your Browser History, Information Aesthetics, Sep. 18, 2009, 2 pages, printed on Jan. 25, 2013.
Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.
Gabber et al., "How to Make Personalized Web Browsing Simple, Secure, and Anonymous," Financial Cryptography, 16 pages (1997).
Gingerich, Jason, "Keycorp Making Site Into Portal," KRTBN Knight-Ridder Tribune Business News (South Bend Tribune, Indiana), Oct. 25, 1999, 2 pages.
Hopper, D. Ian, "Desktops Now Have Power to Comparison-Shop," Oct. 18, 1999, printed from http://www.cnn.com/TECH/computing/9910/18/r.u.sure/index.html, 3 pages.
Rao, H.C.-H.,et al., "A Proxy-Based Personal Web Archiving Service," Operating Systems Review, 35(1):61-72, 2001.
Teevan, J., et al., "Changing How People View Changes on the Web," 2009, Proceedings of the $22^{nd}$ Annual ACM Symposium on User Interface Software and Technology, New York, 2009, pp. 237-246.
Van Kleek, M, Introducing "Eyebrowse"—Track and share your web browsing in real time, Haystack Blog, Aug. 28, 2009, 3 pages, printed on Jan. 25, 2013.
Web page titled "RSS Ticker: Add-ons for Firefox," https://addons.mozilla.org/en-US/firefox/addon/rss-ticker/, 3 printed pages, printed on Feb. 7, 2013.
Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.
U.S. Appl. No. 14/285,317, filed May 22, 2014.
U.S. Appl. No. 14/285,492, filed May 22, 2014.
U.S. Appl. No. 14/285,200, filed May 22, 2014.
U.S. Appl. No. 14/285,060, filed May 22, 2014.
U.S. Appl. No. 14/285,275, filed May 22, 2014.
U.S. Appl. No. 14/285,300, filed May 22, 2014.
U.S. Appl. No. 14/285,477, filed May 22, 2014.
U.S. Appl. No. 14/285,442, filed May 22, 2014.
U.S. Appl. No. 14/302,261, filed Jun. 11, 2014.
U.S. Appl. No. 14/285,334, filed May 22, 2014.
U.S. Appl. No. 13/371,314, filed Feb. 10, 2012.
U.S. Appl. No. 15/281,926, filed Sep. 30, 2016.
U.S. Appl. No. 15/276,663, filed Sep. 26, 2016.

\* cited by examiner

FIG. 1

| Session # | User ID | Activity stream |
|---|---|---|
| 1001 | 8192 | Page1: Select_Widget2, Scroll_Section2, Highlight_Text7, SelectLink_Page9. Page9: EnterText_Field3, Select_button3. Page2: Scroll_Section2, Scroll_Section3, Expand_Widget9, SelectLink_Page3. |
| 1002 | 8192 | Page1: Scroll_Section2, SelectLink_Page9. Page9: EnterText_Field3, Select_button3. |
| 1003 | 523 | Page9: EnterText_Field3, Select_button3. Page2: Scroll_Section2, Scroll_Section3, Expand_Widget9, SelectLink_Page3. |
| 1004 | 88 | Page2: Scroll_Section2, Scroll_Section3, Expand_Widget9, SelectLink_Page3. Page5: Scroll_Section2, SelectLink_Page6. |
| 1005 | 971 | Page9: EnterText_Field2, EnterText_Field3, Select_button3. ...... |

NETWORK CONTENT LAYOUT USING AN INTERMEDIARY SYSTEM

BACKGROUND

Generally described, computing devices and communication networks can be utilized to exchange information. In a common application, a computing device can request content from another computing device via the communication network. For example, a user at a personal computing device can utilize a software browser application to request a page from a server computing device via the Internet or another network. In such embodiments, the user computing device can be referred to as a client computing device and the server computing device can be referred to as a content provider.

From the perspective of a user utilizing a client computing device, a user experience can be defined in part in terms of the performance and latencies associated with obtaining network content over a communication network, such as obtaining a Web page, processing embedded resource identifiers, generating requests to obtain embedded resources, and rendering content on the client computing device. Latencies and performance limitations of a particular client computing device or network may diminish the user experience. Additionally, latencies and inefficiencies may be especially apparent on computing devices with limited resources, such as limited processing power, memory or network connectivity, which may occur on a mobile computing device like a tablet or smartphone. The user experience on certain mobile devices when viewing a given page may also be adversely affected by a limited screen size and/or limited input options (e.g., user interactions being limited to touches on a touchscreen instead of access to a keyboard and multi-button mouse).

For the above and other reasons, website operators or other network content providers will often design different versions of their pages for display on client mobile devices than for display on display monitors of traditional desktop or laptop computers. Pages designed specifically for mobile devices are often referred to as mobile friendly or mobile optimized pages. Relative to a standard version of a given page, a mobile optimized page may include, for example, a rearranged content layout, larger selectable options to account for imprecise touch gestures, and/or other changes. Developers and/or designers often spend substantial time designing mobile optimized pages and testing the usability and appearance of such pages on various mobile devices.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Generally described, aspects of the present disclosure relate to automated approaches for determining the portions of one or more user interfaces or pages, such as webpages, that are likely to be of interest to a user who is accessing a page from a mobile computing device, and providing for automated generation of an optimized page that includes only a relevant subset of the original page content. In one embodiment, an intermediary system is positioned in a network between client computing devices and an organization's content sever. In one example, the organization may be a company, the page content available via the organization's content server may be corporate intranet pages available only to employees or other members of the organization, and the client computing devices may be used by the organization's employees or other members to view the pages. The intermediary system may receive a variety of user interaction data (including, for example, scroll requests, zoom requests, text highlighting, and others) beyond what would typically be captured and returned to a server in a traditional browsing environment that does not utilize an intermediary system as described herein. The intermediary system may analyze the interaction data and the series of actions followed by a potentially large number of users to identify the portions of one or more pages that are typically of interest to one or more groups of users (such as page portions that are most often accessed or most often interacted with) when accessing pages from their mobile computing devices, and may generate a mobile-optimized page template that is then used to generate graphical page representations for delivery to mobile client computing devices in response to subsequent page requests from users in the given user group.

In one embodiment, when a client computing device requests a page associated with the organization's content server, the page may first be generated in a graphical representation form with associated control information (discussed further below) by the intermediary system, then delivered from the intermediary system for display in the graphical form to the client computing device. The graphical representation of the page may be sent to the client computing device along with code that enables the user's browsing experience to mimic a traditional browsing experience (for example, interactions with the page may not seem different from the user's perspective than if the original page had been sent to the client computing device from the organization's content server rather than a graphical representation of the page having been sent from the intermediary system). In order for the client computing device to respond properly to user interactions with the graphical page representation, code and control information associated with the graphical page representation may instruct the client computing device to send various interaction data identifying user actions taken with respect to the page (such as scroll requests, zoom requests, text highlighting, and others) in order for the intermediary system to determine whether additional content should be sent to the client computing device in response to each interaction.

Aspects of the present disclosure include leveraging this rich interaction data to at least semi-automate the creation of mobile-optimized versions of pages that are available as part of a company's internal website or other set of pages or user interfaces that are available to the organization's employees or other members. This is particularly beneficial in the context of a company's internal pages that are not accessed by people outside of the organization's employees or members because organizations often do not invest as many resources in manually optimizing these pages for access from mobile computing devices as the same organizations may invest in optimizing their publicly-accessible pages that are typically accessed by a much larger number of people, including by customers.

As discussed above, one method for reducing page load times is to offload some of the processing (including rendering) to an intermediary system (e.g., a proxy system) that sits logically between the user's computing device and a system that hosts the network page or content page. For example, instead of the user's device accessing the host system that hosts the network page (e.g., webpage) to access or retrieve each content resource (e.g., images, text, audio, video, scripts, etc.) of the network page, the intermediary system can retrieve each of the content resources, render the page, and can generate a graphical representation (e.g., digital photos, images, or snapshots) of all or a portion of the page. The intermediary system can then provide the graphical representation to the user's device for presentation to the user. This approach often reduces page load times experienced by end users. This reduction is due in part to the reduced need for the user device to handle computation-intensive page rendering tasks. Thus, presenting a graphical representation of the page to a user can result in noticeable performance improvements.

However, for content pages that include interactive elements (e.g., search fields, drop-down boxes, hyperlinks, etc.), presenting a graphical representation of the page without more may be unacceptable for some use-cases. One solution to this problem involves emulating one or more interactive elements, or controls, of a content page on a user device. The emulated interactive elements or emulated controls may be included as part of an overlay layer positioned above a graphical representation of the content page. Information or control metadata for each control included in the content page may be provided to a user device along with the graphical representation of the content page. The user device, or systems therein, may use the control metadata to identify types of controls to emulate. Further, the user device may identify where to position the emulated control with respect to the graphical representation of the content page based at least partially on the received control metadata. Systems and methods for providing such emulated controls are discussed in more detail in co-owned U.S. Pat. No. 9,037,975, titled "Zooming Interaction Tracking and Popularity Determination," filed Feb. 10, 2012 and issued May 19, 2015.

Interactions with the emulated controls may be provided to the intermediary system for processing. Further, an identifier of the control being simulated by the emulated control that received the user input may be provided to the intermediary system. Using the identifier of the control to identify the control, the intermediary system may interact with the control of the content page at a host system based on the user input received by the emulated controls. In some cases, interactions with the content page may result in the content page being modified and/or a new content page being retrieved. In some such cases, the intermediary system may generate a new graphical representation associated with the updated content page and/or the new content page. This new graphical representation may be provided to the user device for display to the user. Thus, in certain embodiments, the processing of interactions with a content page may be offloaded from a user device to an intermediary system. Further, in some embodiments, by offloading the processing to the intermediary system, page load times perceived by end users are reduced without loss of interactivity with the page. Aspects of the present disclosure include further optimizing such content pages for display on mobile computing devices based on an analysis of aggregated user interactivity data for various user groups.

Figure 1:
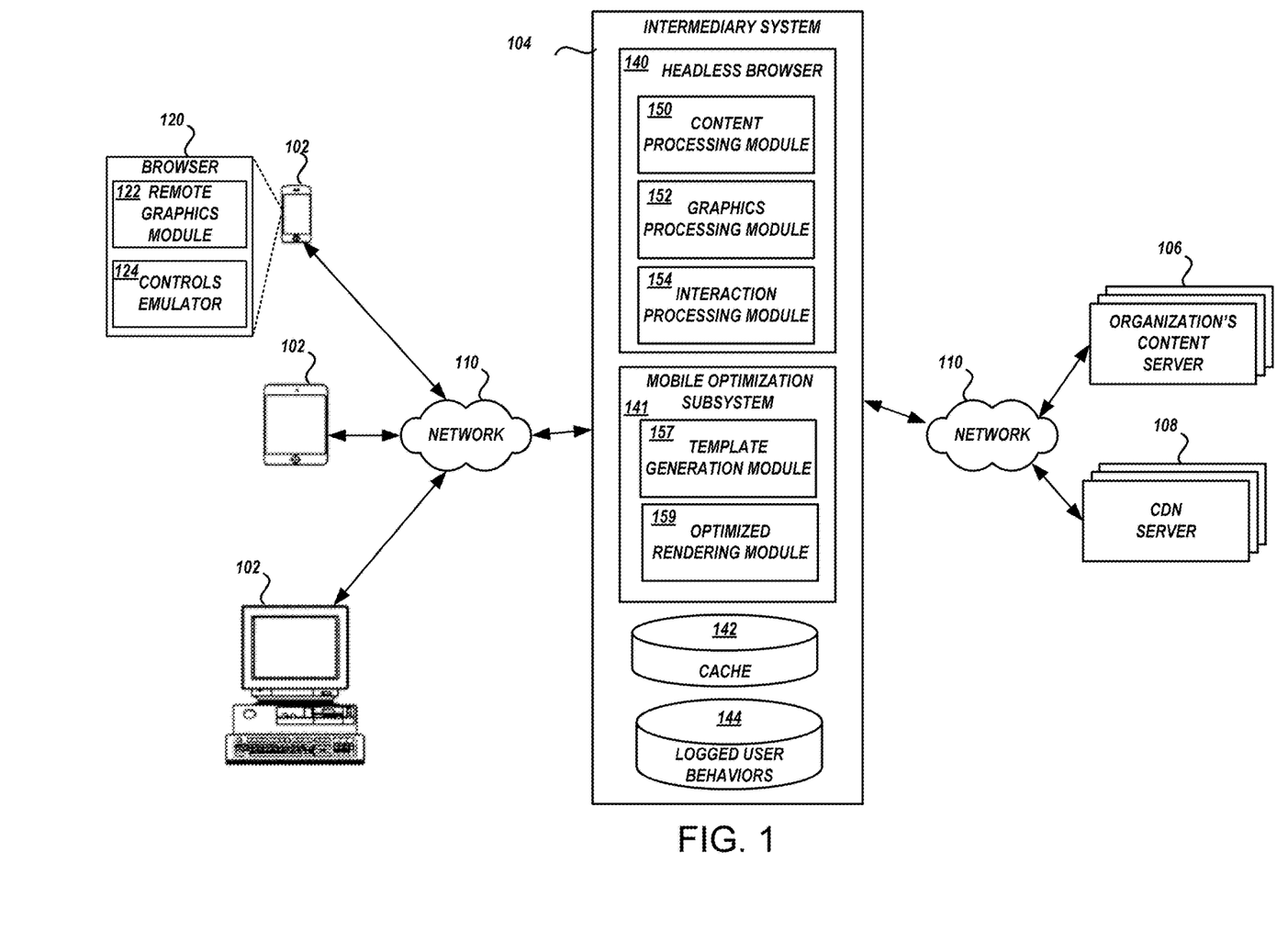
FIG. 1 illustrates an example network environment in which features can be implemented for generating graphical page representations at an intermediary system, generating display commands for execution at a user device, and generating mobile page templates based on an analysis of user interaction data.

FIG. 1 illustrates an example network environment in which features can be implemented for generating graphical page representations at an intermediary system, generating display commands for execution at a user device, and generating mobile-optimized page templates based on an analysis of user interaction data. The network environment shown in FIG. 1 includes various user devices 102, an intermediary system 104, and various content sources, including an organization's content servers 106 and content delivery network ("CDN") servers 108 (which may be optional in some embodiments). The organization that operates the content server 106 (or that has its page content accessible via the content servers 106) may be, for example, a company, a government entity, a nonprofit organization, or other organization that makes one or more pages available for access by its employees, members, or other affiliated individuals. The system components may communicate with each other via one or more communication networks 110. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc., or combination thereof, each with access to and/or from an external network, such as the Internet.

As will be appreciated by those of skill in the relevant art, a network environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to groups of current or potential user devices 102 or content sources 106, 108. In such a configuration, a user device 102 may request content via the intermediary system 104 to which it is closest, rather than all user devices 102 requesting content via a single intermediary system 104. In some embodiments, the intermediary system 104 may operate in association with only a single organization's content server(s) 106, while in other embodiments the intermediary system 104 may provide page rendering and optimization services to a number of different organizations that each operate different content servers.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), kiosks, and various other electronic devices and appliances. Individual user devices 102 may execute a browser application 120 to communicate via the network 110 with other computing systems, such as the intermediary system 104 or content sources 106 and 108, in order to request and display content.

Illustratively, a user may use a browser application 120, or other application capable of accessing a network site, to request network-accessible content (e.g., content pages, images, video, etc.) hosted or provided by a content source, such as an organization's content server 106 or a CDN server 108. The user device 102 or browser application 120 may be associated with the intermediary system 104 or otherwise configured to request the content through, and receive content display commands from, the intermediary system 104 rather than communicating directly with the content source. The browser application 120 may include a remote graphics module 122 that receives remotely-generated display commands, such as those generated by the intermediary system 104. The remote graphics module 122 (or some other module of the browser application 120 or user device 102) can execute the remote-generated display commands to display a representation of the requested content on the user device 102. Advantageously, the remote graphics module 122 may facilitate the display of graphical representations of requested content on the user device 102 without requiring the user device 102 to receive content files (e.g., HTML files, JPEG images, etc.) from content sources 106 and 108.

In some embodiments, the browser 120 may be a conventional web browser or network-site browser that is not specifically designed or configured to execute remotely-generated graphics commands and other display commands. For example, the browser 120 may use or otherwise be associated with a remote graphics module 122 that may or may not be integrated with the browser 120, such as a browser add-in or extension. In some embodiments, applications other than a browser 120 may include or use a remote graphics module 122 (or some similar module) to execute graphics commands generated by an intermediary system 104. For example, content aggregators or other specialized content display applications for mobile devices may utilize a remote graphics module 122.

The browser 120 may include a controls emulator 124, which may be configured to emulate, or generate representations of, one or more controls of a content page. The controls emulator 124 may use control metadata received from the intermediary system 104 to determine the number of controls to emulate, the type of controls to emulate, and the location of the controls with respect to a content page. Using the control metadata, the controls emulator 124 can emulate one or more controls and position the emulated controls over a graphical representation of the content page on the user device. Advantageously, in certain embodiments, by positioning emulated controls over the graphical representation of the content page a user can interact with the content page despite being presented with the graphical representation of the content page in place of the content page. In other words, in some cases, although a user may be presented with an image or snapshot of the content page, the user may interact with the content page using the emulated controls that are positioned or layered over the image of the content page.

In certain embodiments, the emulated controls include the same or similar functionality as the controls they mimic. When a user interacts with the emulated controls, the interaction and/or input to the emulated controls may be provided to the intermediary system 104. Intermediary system 104 may replicate the interaction on a system that hosts the content page (e.g., the organization's content server 106) and/or may provide the input to the host system of the content page. In certain embodiments, intermediary system 104 may access and/or retrieve a modified version of the content page that is responsive to the interaction with and/or input provided to the host system of the content page. The intermediary system 104 may generate a graphical representation of the modified version of the content page and provide the graphical representation to the user device 102. Thus, in certain embodiments, the user may interact with a content page via emulated controls and through the intermediary system 104 despite being presented with an image or graphical representation of the content page at the user device 102 in place of the content page itself. In some embodiments, the functionality of the remote graphics module 122 and/or controls emulator 124 may be implemented by a typical browser application operating on the user device 102 as a result of the browser executing code received from the intermediary system 104 when receiving the graphical representation of a page, without necessarily requiring any specialized browser, software installation, or a browser plug-in on the user device.

The intermediary system 104 can be a computing system configured to retrieve content on behalf of user devices 102 and generate display commands for execution by the user devices 102. For example, the intermediary system 104 can be a physical server or group of physical servers that may be accessed via the network 110. In some embodiments, the intermediary system 104 may be a proxy server, a system operated by an internet service provider (ISP), and/or some other device or group of devices that retrieves content on behalf of user devices 102.

The intermediary system 104 may include various modules, components, data stores, and the like to provide the content retrieval and processing functionality described herein. For example, the intermediary system 104 may include a server-based browser application or some other content rendering application to process content retrieved from content sources. Such a content rendering application may be referred to as a "headless browser" 140. Generally described, a headless browser 140 does not (or is not required to) cause display of content by a graphical display device of the server on which the headless browser 140 is executing. Instead, the headless browser 140 provides display commands, graphical representations, images, or other data or commands to separate user devices 102 that can cause the presentation of content accessed by the headless browser 140 on one or more of the separate user devices 102. Illustratively, the headless browser 140 may obtain requested content from an organization's content server 106 and/or CDN server 108, obtain additional items (e.g., images and executable code files) referenced by the requested content, execute code (e.g., JavaScript) that may be included in or referenced by the content, generate graphics commands to display a graphical representation of the content, and transmit the graphics commands to the user device 102. Further, in some cases, the headless browser 140 may create graphical representations of a content page or a network page, or one or more content resources of the content page, and provide the graphical representations to the user device 102. By performing some or all of these operations at the intermediary system 104, the substantial computing resources and high-speed network connections typically available to network-based server systems may be leveraged to perform the operations much more quickly than would be possible on a user device 102 with comparatively limited processing capability.

The headless browser 140 may include various modules to provide the functionality described above and in greater detail below. For example, the headless browser 140 may include a content processing module 150, a graphics processing module 152, and an interaction processing module 154. The content processing module 150 may include any system that can parse content files and generate a document object model ("DOM") or similar representation of the content. Further, in some cases, the content processing module 150 may include logic for determining how to divide a content page into a set of tiles to be provided to the browser 120 and/or the remote graphics module 122.

The graphics processing module 152 may include any system that can receive the DOM representation and generate display commands (e.g., SKIA commands) to render a graphical representation of the content on a user device 102. In some cases, the graphics processing module 152 may further receive definitions or metadata for each tile from the set of tiles determined by the content processing module 150. The graphics processing module 152 may use the tile definitions to generate the display commands to render the graphical representation of the content at the user device 102. For instance, each tile may be associated with its own display command or set of commands for displaying the tile on the user device 102. In some embodiments, the graphics processing module 152 instead of, or in addition to, the content processing module 150 may determine how to divide the content page into the set of tiles. The interaction processing module 154 may include any system that communicates with the browser 120 to receive information regarding interactions with the content on the user device 102 and to update the graphical representation of the content, if necessary. Further, the interaction processing module 154 may provide the tiles and/or display commands to the user device 102. In some embodiments, a headless browser 140 may include additional or fewer modules than those shown in FIG. 1. The use of tiles and associated display commands, including generating responsive content based on interaction with an emulated control, is discuss in more detail in co-owned U.S. patent application Ser. No. 14/285, 317, titled "Emulation of Control Resources for Use with Converted Content Pages," filed May 22, 2014, the disclosure of which is hereby incorporated by reference in its entirety herein.

The intermediary system 104 may include additional modules, components, data stores, and the like to provide the features described above and in greater detail below. For example, the intermediary system 104 may include a cache 142 that stores content items retrieved from content sources 106 and/or 108, graphics commands generated by the headless browser 140, graphical representations of content resources or portions of the content page, and the like. The intermediary system 104 may also include a logged user behaviors data store 144 that stores information about user requests and interactions with content.

In some embodiments, the cache 142 may store graphical representations of content pages generated by the headless browser 140, together with any controls metadata for emulating one or more controls included in the content pages, for a predetermined period of time after the content page request or after connection between the user device and the intermediary system has terminated. In some embodiments, interactions stored in the logged user behaviors data store 144 can be used to deliver a graphical representation of the content page and controls metadata reflecting previous user interactions with the page. The logged user behaviors data store 144 may, in some embodiments, store an activity stream or set of actions performed by each user, including data associating the activity with a particular user and optionally with a particular browsing session, as will be described further below.

As further illustrated in FIG. 1, the intermediary system additionally includes a mobile optimization subsystem 141, which includes a template generation module 157 and optimized rendering module 159. As will be described further below, the template generation module 157 may analyze user activity data in the logged user behaviors data store 144 to identify portions of pages that are frequently accessed by one or more groups of users when accessing pages from a mobile computing device, and may generate one or more page templates that are optimized for display on mobile computing devices based on the analysis of the user activity data. The optimized rendering module 159 may, in some embodiments, be used in conjunction with the headless browser 140 to optimize a particular graphical representation of a page (or to render an optimized page) for delivery to a particular user device 102 based on a template generated by the template generation module 157. For example, the optimized rendering module 159 may access a template that identifies only a subset of the portions of a particular page from the organization's content server 106, may generate an optimized page for a particular user (such as based on the user's device type) using the template in combination with the original page content from the content server, and may render (optionally in cooperation with the modules 150, 152 and/or 154 of the headless browser 140) a visual representation of the page for display on a client computing device 102.

Although in the examples described herein the intermediary system 104 is configured to communicate between the organization's content servers 106 and user devices 102 to execute the processes described herein, in some embodiments the organization's content servers 106 can be configured to generate graphical representations of content pages and to provide controls metadata to enable the user devices 102 to emulate controls in the content pages and to send the graphical representation of the content pages and the controls metadata directly to a user device. For example, the capability to perform the graphical representation generation processes and the controls metadata determination processes can be provided to organization's content servers 106 in the form of an add-in, plug-in, or extension. Accordingly, any of the graphical representation generation and controls metadata determination processes described herein as being performed by the intermediary system 104 can, in some embodiments, be performed additionally or exclusively by the organization's content servers 106, in which case the intermediary system may be omitted. In such cases, the organization's content server 106 may include a mobile optimization subsystem 141 that enables the organization's content server 106 to optimize its pages for display on mobile devices without the use of an intermediary system.

Figure 2A:
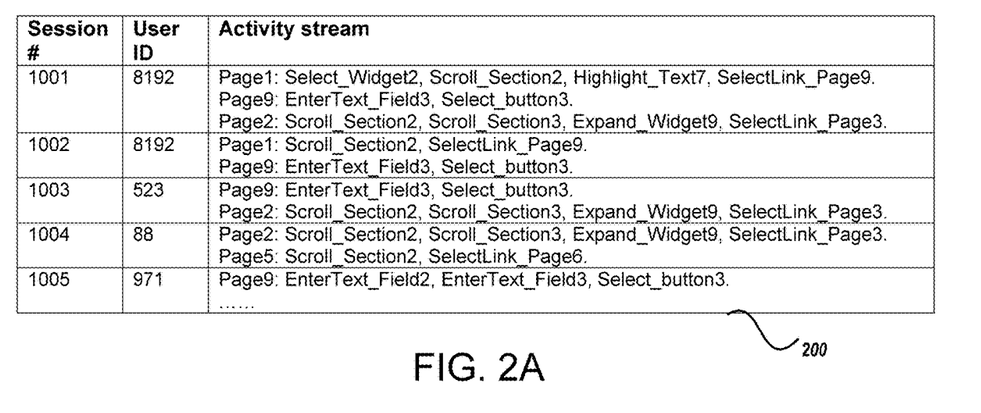
FIG. 2A is an illustrative table representation of user activity data identifying a series of user actions taken with respect to graphical page representations for each of a number of different users.
Figure 2B:
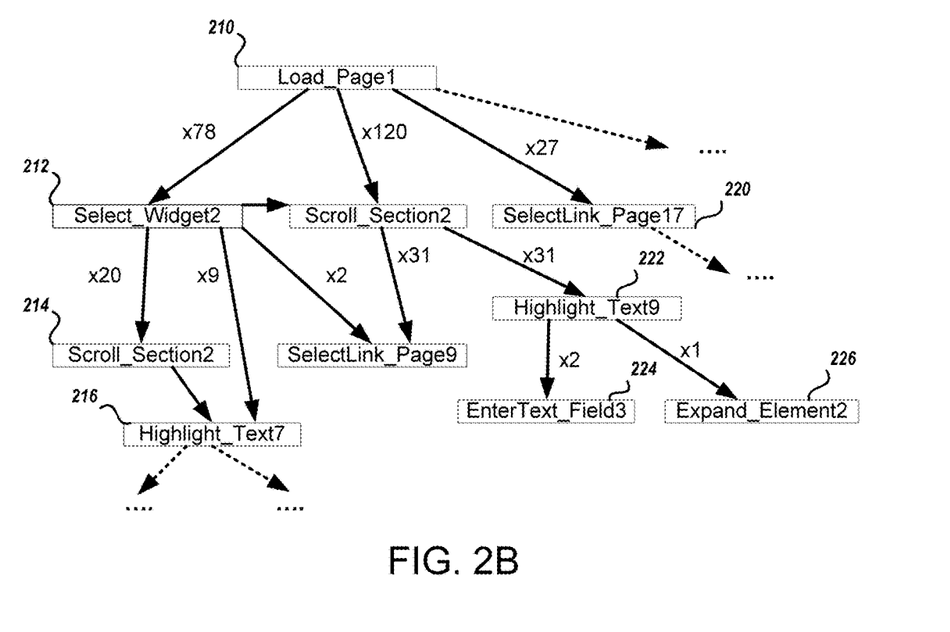
FIG. 2B is an illustrative tree representation that identifies various user action paths taken with respect to a set of pages, as well as indication of the number of users that followed each step of each path.

FIG. 2A is an illustrative table representation 200 of user activity data identifying a series of user actions taken with respect to graphical page representations for each of a number of different users. The data represented in table 200 is intended to provide an illustration of user activity data that may be stored by the intermediary system 104, such as in logged user behaviors data store 144. However, it will be appreciated that the presentation format of the data illustrated in FIGS. 2A and 2B is not necessarily representative of the format or data structures in which the user activity may be stored. For example, the illustrated data would not necessarily be stored in a table format, as lists of user actions, or as a tree structure. Instead, it will be appreciated that a wide variety of data structures and database types are appropriate for storing such activity data, capturing the relationships between particular users and particular actions, and for depicting the order of user actions in an activity stream As illustrated in FIG. 2A, the user activity data may be grouped by session identifier and/or by user identifier. A session may, in some embodiments, correspond to a period of time in which a user operating a user computing device 102 was relatively continually or consistently interacting with page content received from the intermediary system 104. As an example, a given session may include a series of user actions that all occurred without any gap of a threshold duration occurring between any two actions in the series (e.g., without a session "timing out" due to a certain period of inactivity, such as ten minutes). In other embodiments, a session may be defined at least in part by the organization associated with the content server 106 (such as the length of time that a user may be logged into an account with the organization without being asked to enter a password or other credential data), or may last for the length of time that a given user continues to access pages from the same computing device.

The user identifiers illustrated in table 200 may represent, for example, identifiers of user accounts maintained by the organization's content server 106. For example, if the organization is a company, the various user identifiers may each be an account number or account name for a different employee of the company. While the user identifiers appear as numbers in the illustrated embodiment, the user identifiers for some organizations may instead be in the form of an alphanumeric name (such as "john.smith"), which may also be the user name that a given employee enters, along with a password, in order to login or otherwise authenticate himself as eligible to access a corporate website of his employer (e.g., the organization that operates content server 106).

The activity stream (which may also be referred to as user activity data) associated with each session in table 200 includes identification of each of a series of actions taken by the given user in the given session. For example, as illustrated in the first row of table 200, a user having the user identifier "8192" accessed three pages (identified as "Page1," "Page9," and "Page2") during browsing session number "1001." In the illustrated embodiment, each action is identified by both an action type and an object of the action, which are separated by an underscore (e.g., "Scroll_Section2" may indicate that the action was a scroll action, and that the user scrolled to a section or portion of the page identified as "Section2"). While interacting with the page identified as "Page1," the activity stream data in the first row of table 200 represents that the user performed four actions, identified in order as "Select_Widget2" (which may represent that the user clicked, tapped or otherwise selected at least a portion of content that was generated by a particular code module named "Widget2"), "Scroll_Section2," "Highlight_Text7" (which may indicate that the user used a cursor or touch gesture to highlight a portion of text on the page, where that text portion has been labeled "Text?"), and "SelectLink_Page9" (which may indicate that the user select a hyperlink or other option on the page to request a uniform resource identifier ("URI") of a page identified as "Page9"). The format of actions illustrated in table 200 is meant for illustrative purposes according to one embodiment, and it will be appreciated that other formats may be used to identify an action type, action target, and/or other associated data in other embodiments.

In addition to the scrolling, selection and highlighting action types mentioned above, table 200 includes other types of actions, such as a user entering text in a text field presented on the page (e.g., "EnterText_Field2"), pressing or otherwise selecting a button presented on the page (e.g., "Select_button3"), and requesting to expand the amount of content presented by a given code module (e.g., "Expand_Widget9"). As will be appreciated by one of skill in the art, these actions include types of actions that would not typically be reported from a client device back to a server in a traditional browsing environment (e.g., an environment in which the client device receives HTML or similar pages from a server rather than receiving graphical page representation with accompanying emulated control data). However, such rich interaction data is received by the intermediary system 104 in order to properly respond to emulated controls and otherwise properly respond to page interactions with respect to a graphical page representation that has been sent to a user device for display. As an example, in a typical client-server environment, a client device accessing a typical web page would not typically report user actions such as scrolling or text highlighting. Accordingly, the activity stream data received by the intermediary system 104 for each user session may go well beyond the typical link selection and similar limited actions that a typical server may have access to in its "clickstream" data of user actions, and may include many other types of actions beyond even those represented in table 200. Example additional actions may include, for example, various types of zooming, scrolling, highlighting, checkbox or radio button selections prior to form submission, selecting to expand the options in a pull-down menu, hovering of a cursor or similar action for interacting with a tooltip object, other touch or click actions that cause additional content to be displayed, a long press gesture or right-click action (which may cause options to appear such as saving a file), taking a screenshot, etc.

FIG. 2B is an illustrative tree representation that identifies various user action paths taken with respect to a set of pages, as well as indication of the number of users that followed each step of each path. As mentioned above, the illustrated actions and other data represented in FIG. 2B are depicted in a tree format for illustrative purposes to assist in visualizing the connections between the various data, but it will be appreciated that a tree structure need not be used to store the data represented in FIG. 2B. The tree partially shown in FIG. 2B may represent aggregated user activity data for users of a given website (such as a corporate intranet or other organization's website for access by employees or other members of the organization). The aggregated user activity data may have been determined by the intermediary system 104 from a collection of various user activity streams retrieved from logged user behaviors data store 144, which may include the activity streams identified in FIG. 2A discussed above.

The activity tree representation in FIG. 2B includes identification of a number of different paths or series of actions that different users followed after accessing a certain page (identified as "Page1" in the action 210 labeled as "Load_Page1"). Each link between two actions in the tree includes a user count (which may be considered a weight in some embodiments) that indicates the number of users that followed the given path step. For example, seventy-eight different users (indicated by the "x78" in the figure) are indicated as having performed the "Select_Widget2" action 212 as the next action after the "Load_Page1" action 210. In other embodiments, the weights for each path step may represent something other than a count of unique users that followed the given step in the path. For example, in other embodiments, a weight of each link or step may take into account the total number of times a path step was followed as opposed to the number of unique users that followed the given path step (e.g., a single user repeatedly following a certain action path in a number of different sessions may lead to a higher weight than a user who only followed a path once). In other embodiments, the weight may represent something other than a count. For example, the weights may each be a normalized score that takes into account how often users followed different paths from the same starting action, or may be a percentage of users that performed a certain subsequent action after performing a given initial action.

Links illustrated between any two actions in FIG. 2B may represent that at least one user performed the second action after performing the first action. The nodes of the illustrated tree each represent a user action, and may be referred to as action nodes. The intermediary system 104 may traverse the action nodes by following the links or directed edges between the nodes, and the series of actions traversed may collectively form a path. The collective weights encountered on a given path may generally indicate the relative popularity of the path when compared to the collective weights encountered when traversing a different path (e.g., relatively how often users follow one path as opposed to another path). One example path in FIG. 2B can be seen as encompassing action 210, then action 212, then action 214, and then action 216. Another path that at least some users followed encompasses action 210, then 220, then one or more additional actions not illustrated in FIG. 2B. As illustrated at action 222, of the users who highlighted a portion of text identified as "Text9," two of the users subsequently performed the action "EnterText_Field3" (action 224), while one other user performed the action "Expand_Element2" (action 226). In some embodiments, the node representing action 226 may be considered an outlier action given that only one user performed the given action. For example, the intermediary system 104 may determine that the user count (one user) for action 226 falls below a threshold, or may determine that the ratio of the user count for action 226 compared to some other user count (such as either the mean or median user count for actions performed in the tree, or for the actions performed at the given level of the tree) falls below a threshold.

Figure 3:
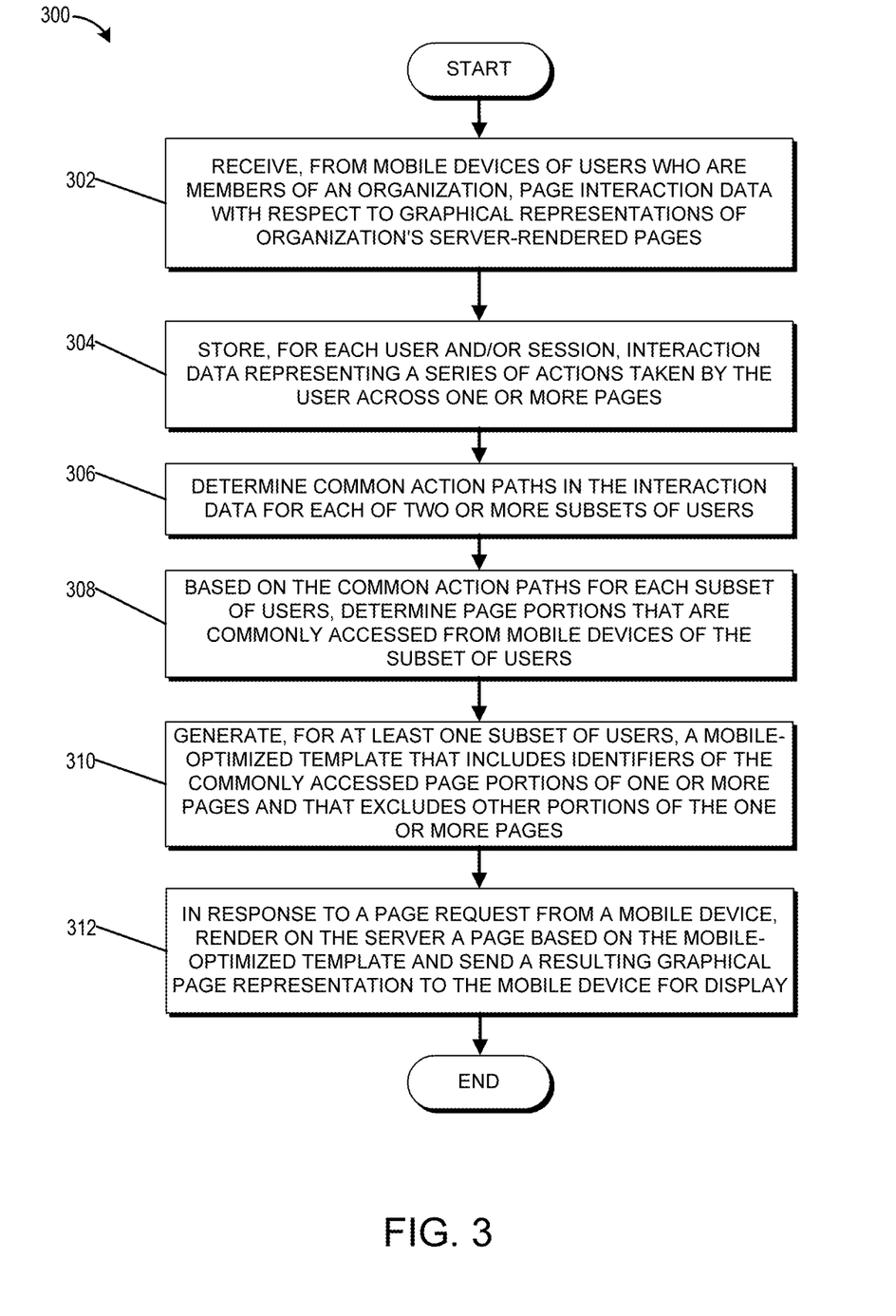
FIG. 3 is a flow diagram depicting an illustrative method for generating a mobile optimized page template in accordance with aspects of the present disclosure.

FIG. 3 is a flow diagram depicting an illustrative method 300 for generating a mobile optimized page template in accordance with aspects of the present disclosure. The illustrative method 300 may be performed, in some embodiments, by the intermediary system (such as by one or more blocks performed by the headless browser 140 and one or more blocks performed by the mobile optimization subsystem 141). As discussed above, in some other embodiments, an organization's content server may provide headless browser and related functionality without the use of an intermediary system, in which case the organization content server 106 may perform a method similar to illustrative method 300. While the method 300 will be described below in reference to a company's internal corporate website for use by employees or other members of the company, this is for illustrative purposes and is not intended to limit the operating environment or the identification of entity types operating the respective servers or systems described herein.

The method 300 begins at block 302, where the intermediary system 104 may receive, from mobile devices operated by users who are members of an organization (such as from user devices 102), page interaction data with respect to visual representations of an organization's server-rendered pages. In one embodiment, as discussed above, each of the pages may originally be retrieved from the organization's content server 106 by the intermediary system 104 in response to a page request from a user device 102, then may have been rendered by the intermediary system 104 in a visual representation form (along with appropriate control data, as discussed above), for display on a particular user device 102 that requested the page. In one example, the organization may be a company that has selected to use the intermediary system 104 for page rendering in order to provide a more secure and/or more controlled browsing environment for sensitive corporate data that may be accessed by remotely located employees (e.g., employees accessing the company's internal website from personal mobile computing devices outside of the company's internal intranet or network).

Users utilizing user devices 102 may, for example, be required to complete a login or authentication process with the organization's content server 106 (e.g., via one or more login pages generated in visual representation form by the intermediary system, which is in communication with the organization's content server 106) in order to access the given user's internal company account, then may be able to browse and interact with a number of pages of the company's internal corporate website via the headless browser 140 of the intermediary system, as discussed above. As discussed in detail above, the intermediary system 104 receives a wide variety of user interaction data during browsing sessions that is used by the intermediary system to render and send additional responsive content in a graphical form (with associated emulated control data) to the respective user device.

At block 304, the intermediary system 104 may store, for each user and/or session, interaction data representing a series of actions taken by the user across one or more pages. The interaction data associated with the various users' browsing sessions may be stored by the intermediary system 104 in user behaviors data store 144. Various examples and forms of the stored interaction data are discussed above with reference to FIGS. 2A and 2B. In some embodiments, the data may be stored both as raw interaction data (e.g., an activity stream for each browsing session that identifies a user and the actions performed with respect to each of one or more pages accessed by the user during the session), as well as in an aggregated form (which may reflect the number of users that followed different paths, as discussed above with respect to the tree representation of activity data in FIG. 2B).

Next, at block 306, the intermediary system 104 may determine common action paths in the interaction data for each of two or more subsets or groups of the users who have accessed the company's pages. In some embodiments, the intermediary system 104 may first filter the browsing sessions to only include those sessions in which a user was utilizing a mobile computing device or a particular class of mobile device (such as a mobile phone or a tablet), as opposed to a desktop computer or other device type. In some embodiments, the user groups may no be predefined, but may each be a dynamically determined subset of users based on a clustering or other grouping method applied to the interaction data by the intermediary system 104. For example, the intermediary system 104 may identify certain users that frequently follow a first action path, and a second set of users that frequently follow a second action path. In such a case, the intermediary system 104 may group the former set of users into a first group and the second set of users into a second group, even if there is no indication to the intermediary system 104 that the users within the first group have anything in common beyond their similar action stream data. In other embodiments, the intermediary system 104 may have access to other account data fro the organization's content server 106 that may be used in whole or in part to group users, such as information regarding each user's role, title, job function or work group at the company. For example, the intermediary system 104 may determine common action paths followed by members of the company's information technology ("IT") department as a first group, and may determine common action paths followed by members of the company's accounting department as a second group.

The common action paths for a given user group, in some embodiments, may include each path or path step that meets a minimum threshold for popularity or commonality among the group members. As one example, for a first group, the intermediary system 104 may identify that there have been a large number of different unique paths followed by users of the first group, but may exclude a portion of the actions along at least some of these paths as not being considered part of a common action path for the first group at block 306 if only a small subset of the users in the first group performed the actions (e.g., these actions may be considered outlier actions due to their frequency among the first group falling below a threshold level). Depending on the embodiment, the thresholds for determining common actions as opposed to outlier actions for a given user group may be set relative to a user count (e.g., the number of unique users who performed the action), relative to a percentage (e.g., the percentage of users in the group who performed the action), the total times the action was performed (e.g., including counting multiple performances of the action by a single user), or an average number of performances of the action per user in the group.

At block 308, the intermediary system 104 may determine page portions that are commonly accessed from mobile devices used by members of each user group based on the common action paths determined for that user group. In some embodiments, some or all of the actions may be stored in a manner whereby the page portion associated with the action is directly evident from the stored action data. For example, the fact that a user interacted with a certain section of a page identified in the company's original page code as "CompanyNavigationBar" may be directly indicated in the stored action data (e.g., a stored action may be identified as "Selected_Item2_CompanyNavigationBar").

In other instances according to some embodiments, the intermediary system 104 may refer back to a graphical representation of a page that was displayed to the user in combination with the action data to determine the portion(s) of the page with which the user interacted. For example, the action data for a given action may be stored with reference to the coordinates, tile or other location information within the graphical representation of the page that was presented to that particular user, in which case the intermediary system 104 may replay the graphical representation-relative action on a cached copy of the graphical page representation previously presented to the user in order to identify a portion identified in the organization's original underlying page (e.g., in an original HTML page) in which the action took place. For example, in some embodiments, the intermediary system 104 may determine a specific portion of text that was highlighted by a user (which the user may have highlighted in order to copy the text to an operating system clipboard) based at least in part on an indication of the coordinates or relative position of a cursor or touch gesture during one or more selection events (e.g., taps on a touchscreen).

In some instances, an individual page stored on the organization's content server 106 may include imbedded code or references to external code that, when executed or interpreted by a browser, dynamically determines or selects content to display in a given portion of a page. For example, a given page may include six different code modules (or calls to code modules that operate on the organization's content server 106), where each code module executes to provide output that indicates displayable content to present in a different section of the page (e.g., six different sections of the page may each be associated with a different code module). Common use of code modules in this manner may be for content that is likely to change frequently (such as company status updates, news, etc.) or content that is customized for the particular user (e.g., incoming messages from other users, user-specific recommendations, etc.). In some embodiments, determining the page portions commonly accessed at block 308 may include identifying the specific code module responsible for generating the content with which the user interacted (instead of or in addition to identification of the page section).

For example, the intermediary system 104 may identify that users frequently interacted with content display by a code module named "LiveNewsUpdates," and may aggregate the interaction counts for this code module's content across different pages for which the code module selected content for display (e.g., on one page the LiveNewsUpdates module may have presented content in the first section of a page, but may have also presented content in a fifth section of a different page). Accordingly, a page "portion" as used herein is intended to be a broad term that may refer to a specific identified section of a page (e.g., "Section 5"), the content output by a specific code module for inclusion in the page, a specific identified control (e.g., a certain button), a portion of text (e.g., a sentence highlighted by a user), any other object within a DOM representation of the page, and/or other discrete or otherwise identifiable page portion, depending on the context.

At block 310, the intermediary system 104 may generate, for at least one subset of users, a mobile-optimized template that includes identifiers of the commonly accessed page portions of one or more pages and that excludes other portions of the one or more pages. As discussed above, a given template generated for a given user group may include references to identifiers of portions of one or more pages that were frequently interacted with by members of the group, and may exclude (e.g., may not include any reference to) other page portions that were less frequently interacted with by members of the group, particularly when accessing the page(s) from mobile devices.

The intermediary system 104 may generate a separate template for each distinct user group for which at least a minimum threshold volume of interaction data has been received. As discussed above, the templates may be specifically intended for use in generating pages for display on mobile computing devices, such that the intermediary system 104 only considers user interactions from users utilizing mobile computing devices in the above-discussed blocks 306 and 308. In some embodiments, the templates may be further customized for a specific class of device. For example, in one embodiment, the intermediary system 104 may generate two mobile-optimized page templates for a first user group, where the first template is for use in generating a page representation for display on a mobile phone and the second template is for use in generating a page representation for display on a tablet computer.

In some embodiments, each page template may be specific to a given page accessible from the organization's content server 106. In other embodiments, a page template may not have a one-to-one correspondence to an original page authored by the organization, but may instead combine commonly-access portions of two or more of the organization's pages. For example, if the intermediary system 104 determined that for a given group of users, users frequently interacted with a first section of a first page, then selected to view a certain second page, then interacted with a second section of the second page, a template may be generated that combines the first section of the first page and the second section of the second page into a single page. In other instances, the intermediary system 104 may separate out portions of a single original page into multiple templates. For example, in the case of a crowded and/or long original page that contains many popular section or portions, the intermediary system 104 may determine that the page should be split into two or three shorter pages. In such a case, the intermediary system 104 may generate templates for each of these shorter pages, along with optionally generating a landing page or other new page that enables a user to select which of the shorter pages to view.

As will be appreciated, the templates may be generated and stored in a variety of file formats and may identify content to be included in a page in a variety of ways, depending on the embodiment. For example, a template file may utilize HTML, JavaScript, XML, CSS, and/or other markup content or code. A given template file may refer to specific portions or objects identified in the underlying original page content (e.g., may reference objects identified in the DOM representation of the underlying page), along with markup tags or code that instruct a browser or other page interpreter to assemble a page at least in part by inserting the referenced objects from the original page into the template. The templates may arrange the objects based on the objects' order or layout in the original page, the popularity of the objects (e.g., the most frequently inter-acted—with objects first), the order that users accessed each object (e.g., placing the objects in an order that they appeared in user action paths), and/or considering best practices in mobile webpage design.

Each template may be stored by the intermediary system 104 in a data store along with an indication of the specific user group, the specific device class (which may be optional in some embodiments) and the specific page(s) of the organization's content server for which the template should be used. Depending on the embodiment and the extent of user account information to which the intermediary system 104 has access, the user group may be identified as a list of user identifiers, as a user attribute (e.g., users associated with a given value in an account field, such as a value of "accounting" for the field "work group"), as a named group assigned by the organization (e.g., "Paralegals"), and/or in another manner.

After a mobile-optimized page template has been generated by the intermediary system 104, the intermediary system 104 may begin using this template when rendering graphical page representations in response to subsequent page requests from a mobile device used by a member of the relevant user group. For example, at block 312, the intermediary system 104 may, in response to a page request from a mobile device used by a user in a given group, render a graphical page representation based on a mobile-optimized template (including retrieving the objects referenced therein from an original page of the organization) and send the resulting graphical page representation to the mobile device for display.

In other embodiments, the intermediary system 104 may not automatically begin using the mobile-optimized templates after generation of the templates (e.g., may not perform block 312), but may instead provide one or more templates to the organization (e.g., by sending the templates to the content server 106, by email, or when a organization administrator accesses an account associated with the operator of the intermediary system 104) as a suggestion of content and format to include in given pages when designing a mobile-optimized page set. The intermediary system 104 may provide the organization with the list of user identifiers associated with a given template, such that an administrator at the organization can determine what those users have in common (e.g., the administrator may recognize that a given user group dynamically assembled by the intermediary system 104 based on identifying action similarities appears to include mostly customer service personnel of the organization).

Figure 4A:
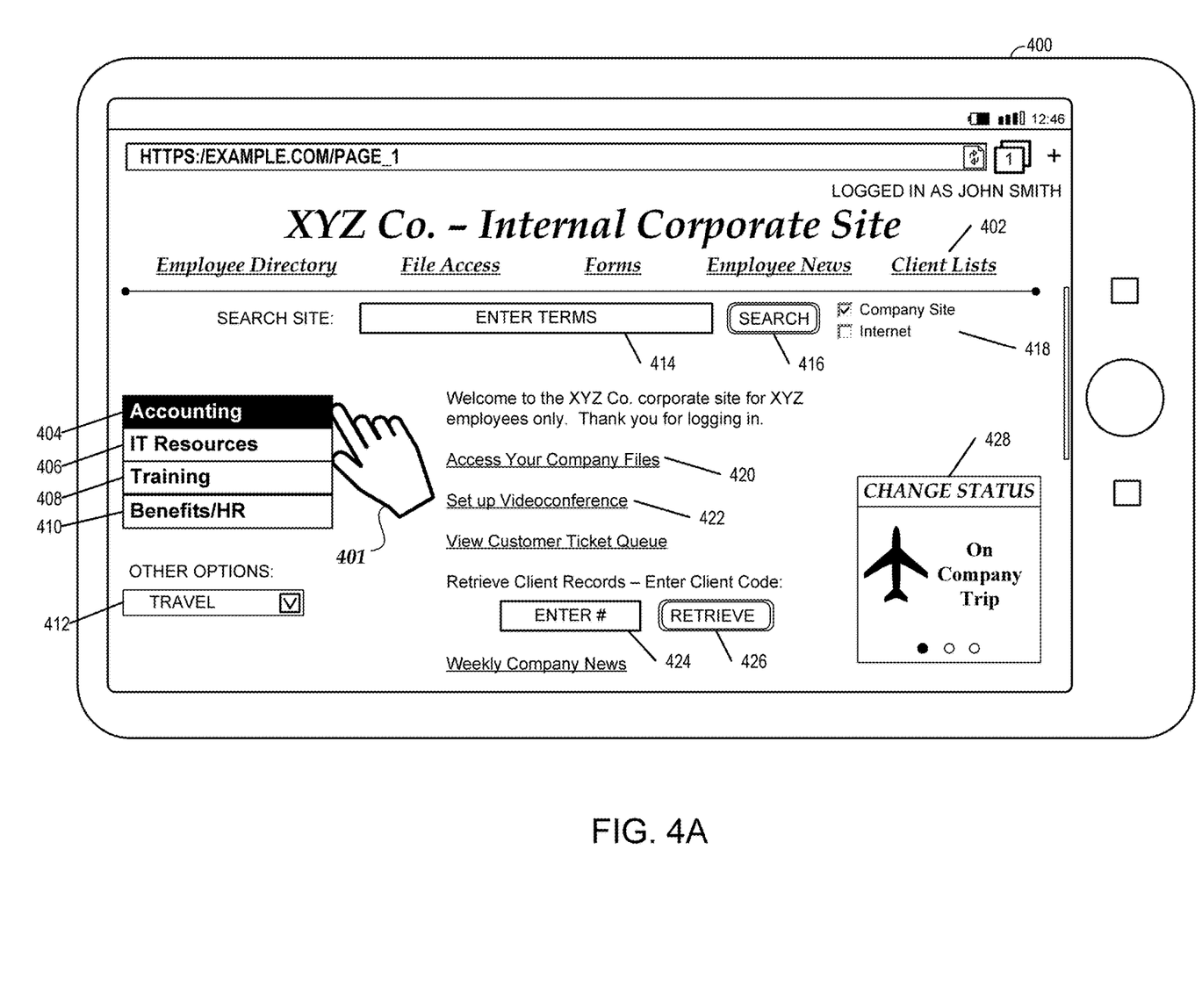
FIG. 4A is an illustrative user interface, as displayed on a mobile computing device, that includes page content of a page that has not been optimized for display on mobile devices.

FIG. 4A is an illustrative user interface, as displayed on a mobile computing device 400, that includes page content of a page that has not been optimized for display on mobile devices. The user interface may be, for example, a page from the organization's content server 106 that has been rendered in a graphical representation form by the intermediary system 104 for display on a user device 102. The page may have been originally authored by the organization with the intent that the page be primarily displayed on a display monitor of a desktop computer (e.g., by an employee accessing the page on the employee's work computer during business hours), rather than being designed or optimized for display on a mobile device having a smaller screen and more limited control options (e.g., it may be difficult to accurately tap some of the smaller options on the page using an imprecise touch gesture).

As illustrated, the graphical representation in FIG. 4A includes selection options 404, 406, 408 and 410 in a navigation bar along the left side of the graphical representation, and the user may have selected the "Accounting" option 404 by touching a touchscreen display at a touch location corresponding to the finger of the illustrated hand 401 (representing a user's finger touching the screen). The page representation also includes a menu 412, selectable links 402, search field 414, search button 416, checkboxes 418, selectable options 420 and 422, text entry field 424, button 426, and status section 428. Status section 428 may display content that was dynamically selected by a particular code module to display the particular user's current status (e.g., "On Company Trip"), which the user may interact with by swipe motion to change the current status. In some embodiments, each of the numbered elements may be considered a page portion or object, and the page includes additional portions or objects not specifically numbered in the figure.

Figure 4B:
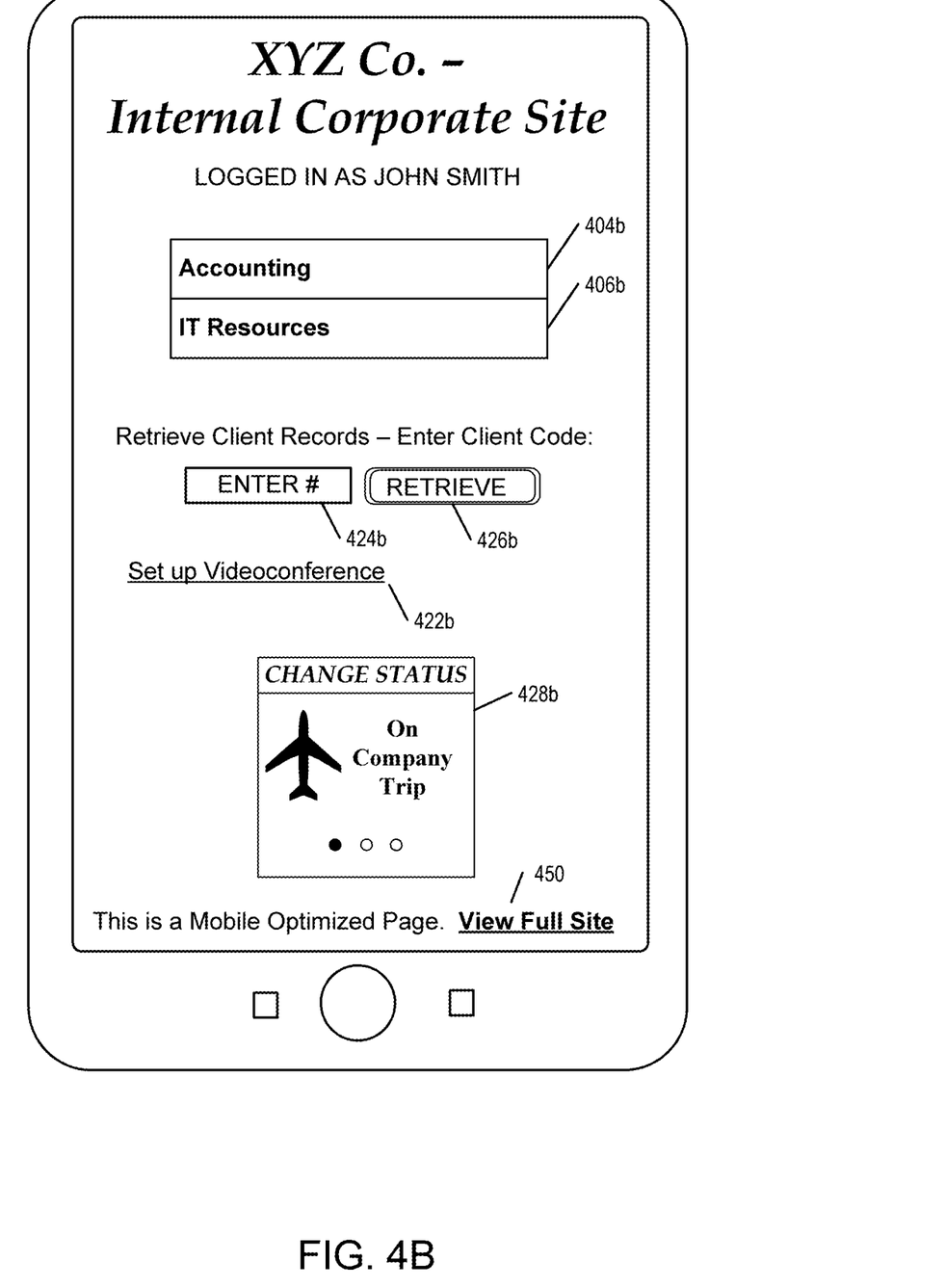
FIG. 4B is an illustrative user interface, as displayed on a mobile computing device, that includes page content of a page that has been rendered based at least in part on a mobile-optimized page template generated according to aspects of the present disclosure.

FIG. 4B is an illustrative user interface, as displayed on a mobile computing device, that includes page content of a page that has been rendered based at least in part on a mobile-optimized page template generated by the intermediary system 104 according to aspects of the present disclosure. The user operating the mobile device in FIG. 4B may be a member of the same user group as the user discussed above with reference to FIG. 4A and the organization's underlying page may be the same (e.g., this user may have requested the same URI or page identifier from the intermediary system as in FIG. 4A), but the page representation in FIG. 4B may have been generated after the intermediary system 104 received sufficient activity data for the user group to generate a mobile-optimized page template for the page. As discussed above, the template used in rendering the mobile-optimized page may have been generated based on a determination of the intermediary system 104 that only a subset of the portions of the original page are commonly accessed by users of the group when accessing the page from mobile devices, and the intermediary system 104 may therefore have excluded the less common portions of the page from the template.

As illustrated, the mobile-optimized page rendered by the intermediary system 104 for display on the mobile device in FIG. 4B includes less content than the original page. As an example, the navigation bar now includes selectable options 404b and 406b (which correspond to options 404 and 406 in FIG. 4A), but does not include the other options (options 408 and 410) in the original navigation bar. Similarly, the page representation in FIG. 4B includes elements 4424b, 426b and 428b without including some of the surrounding content from the original page, and includes selectable option 422b in a different order or location than in the original page. The page also includes option 450 that enables the user to request to view the full original page (e.g., to see a view similar to that presented in FIG. 4A) if the user would like to access some of the less commonly accessed page content. In some embodiments, an original page view option similar to option 450 may be added automatically to each template generated by the intermediary system 104.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a", "an", or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others. All such modifications and variations are intended to be included herein within the scope of this disclosure and protected by the following claims.

What is claimed is:

1. A system comprising:
   a database that stores user activity information identifying user interactions with graphical page representations of network-accessible pages for an organization, wherein the user activity information includes identification of user interactions initiated by users that are members of the organization; and
   a hardware processor in communication with the database, the hardware processor configured to execute computer-executable instructions to at least:
      receive, from each of a plurality of mobile computing devices, page interaction data for graphical representations of pages for the organization, wherein the graphical representations of pages are rendered by the system, wherein the page interaction data from each individual mobile computing device is associated with a user of the individual mobile computing device, wherein at least some of the interaction data is used by the system to render and send additional graphical representations of page content for display;
      update the user activity information in the database based on the page interaction data;
      determine, based on the user activity information stored in the database, a first set of actions performed by each of a plurality of users in a first user group;
      determine, for the first user group based on the first set of actions, a plurality of commonly accessed page portions of a given page, wherein the commonly accessed page portions are page portions with which at least a subset of users in the first user group interacted;
      generate an optimized page template that (a) includes identifiers of the commonly accessed page portions for the first user group and that (b) excludes one or more other identifiers of other portions of the given page that are not the commonly accessed page portions for the first user group, wherein each of the identifiers is a different object identifier from a document object model associated with the given page; and
      in response to a request for the given page from a mobile computing device of a user in the first user group:
         retrieve, from a server of the organization, page content of the given page;
         render an optimized graphical page representation using the optimized page template and the page content retrieved from the server of the organization, wherein the optimized graphical page representation includes a first subset of page content that is extracted from the page content retrieved from the server based on a determination that the first subset is associated within the given page with one or more object identifiers included in the optimized page template, wherein at least a second subset of the page content retrieved from the server of the organization is not included in the optimized graphical page representation, wherein the second subset of the page content is not associated with any object identifiers included in the optimized page template; and
         send the optimized graphical page representation to the mobile computing device of the user in the first user group for display.

2. The system of claim 1, wherein the hardware processor is further configured to execute computer-executable instructions to at least:
   generate a second optimized page template that includes identifiers of commonly accessed page portions for a second user group, wherein the commonly accessed page portions for the second user group are different than the commonly accessed page portions for the first user group; and
   render, for display on a mobile computing device of a user in the second user group, a second optimized graphical page representation using the second optimized page template.

3. The system of claim 1, wherein the commonly accessed page portions for the first user group comprise a portion of text, an image, a selectable reference to a network-accessible page, a text-entry field, a button, a menu, or page content generated for display by a specific code module.

4. The system of claim 1, wherein the user interactions identified in the user activity information include a scroll request, a user selection of a selectable option, user entry of text input, a long press, or user highlighting of a portion of text.

5. A computer-implemented method comprising:
as implemented by one or more computing devices configured with specific executable instructions,
retrieving user activity information from a database, wherein the user activity information includes, for users that each individually viewed a graphical representation of a page via a mobile computing device, a series of user actions performed with respect to the page, wherein the users are members of an organization;
grouping the users into a first user group and a second user group, wherein a first subset of users are assigned to the first user group based on a determination that activity information for individual users in the first subset of users have an action in common;
determining, for the first user group, a plurality of page portions of the page that are of interest to the first user group, wherein the page portions are determined to be of interest to the first user group based on a determination that a threshold number of users in the first user group interacted with the page portions;
generating a page template that (a) includes identifiers of the page portions determined to be of interest to the first user group and that (b) excludes at least one identifier of a portion of the page that is not among the page portions determined to be of interest for the first user group, wherein each of the identifiers is a different object identifier from a document object model associated with the page; and
in response to a request for the page from a first mobile computing device of a user in the first user group:
retrieving page content of the page from a server associated with the organization;
rendering a graphical page representation using the page template and the page content, wherein the graphical page representation includes a first subset of page content that is extracted from the page content retrieved from the server based on a determination that the first subset is associated within the page with one or more object identifiers included in the page template, wherein at least a second subset of the page content is not included in the graphical page representation, wherein the second subset of the page content is not associated with any object identifiers included in the page template; and
sending the graphical page representation to the first mobile computing device of the user in the first user group for display.

6. The computer-implemented method of claim 5, wherein the page is retrieved, by an intermediary system, from the server associated with the organization, and wherein the graphical representation of the page is rendered by the intermediary system.

7. The computer-implemented method of claim 6, wherein the intermediary system is external to the server associated with the organization and is operated by an entity other than the organization.

8. The computer-implemented method of claim 6, further comprising sending to a computing system associated with the organization the page template and a list of user accounts associated with the first user group.

9. The computer-implemented method of claim 5, further comprising identifying a user action as an outlier action relative to other user interactions in the user activity information, wherein the page template excludes a portion of a page associated with the outlier action.

10. The computer-implemented method of claim 9, wherein the outlier action comprises an action performed by less than a threshold number of users.

11. The computer-implemented method of claim 5, wherein the page template is specific to a first type of mobile computing device, wherein a second type of mobile computing device is associated with a second page template that is different than the page template.

12. The computer-implemented method of claim 5, wherein each of the plurality of page portions of the page that are of interest to the first user group comprises a different object in the document object model associated with the page.

13. The computer-implemented method of claim 12, wherein the identifiers of the page portions determined to be of interest to the first user group are selected from among a plurality of object identifiers included in the document object model associated with the page.

14. The computer-implemented method of claim 5, wherein the page template includes a computer instruction to present a selectable option to view an original version of the page that includes the other portions of the page that are excluded from the page template.

15. The computer-implemented method of claim 5, wherein a page layout of the page portions determined to be of interest to the first user group in the page template is optimized for display on a display screen of a mobile phone.

16. A system comprising:
a database that stores user activity information for a plurality of pages; and
one or more hardware processors in communication with the database, the one or more hardware processors configured to execute computer-executable instructions to at least:
retrieve the user activity information from the database, wherein the user activity information includes, for users that each individually viewed a page via a mobile computing device, a series of user actions performed with respect to the page, wherein the users are members of an organization;
determine, based on the user activity information, page portions of the page with which at least a subset of the users have interacted;
generate a page template for the page that (a) includes identifiers of the page portions with which the subset of the users have interacted and that (b) excludes one or more other identifiers of portions of the page other than the page portions with which the subset of the users have interacted, wherein each of the identifiers is a different object identifier from a document object model associated with the page; and
in response to a request for the page from a first mobile computing device:
retrieve page content of the page from a server associated with the organization;
generate a graphical page representation using the page template and the page content, wherein the graphical page representation includes a first subset of page content that is extracted from the page content retrieved from the server based on a determination that the first subset is associated within the page with one or more object identifiers included in the page template, wherein some of the page content retrieved from the server is not included in the graphical page representation based on the page template; and send the graphical page representation to the first mobile computing device for display.

17. The system of claim 16, wherein the other portions of the page include a portion of the page that was accessed by less than a threshold number of the plurality of users.

18. The system of claim 16, wherein the actions include a scroll request, user entry of text input, or user highlighting of a portion of text.

19. The system of claim 16, wherein the series of user actions comprise an action that does not result in requesting a uniform resource identifier.

* * * * *